Figure 1:
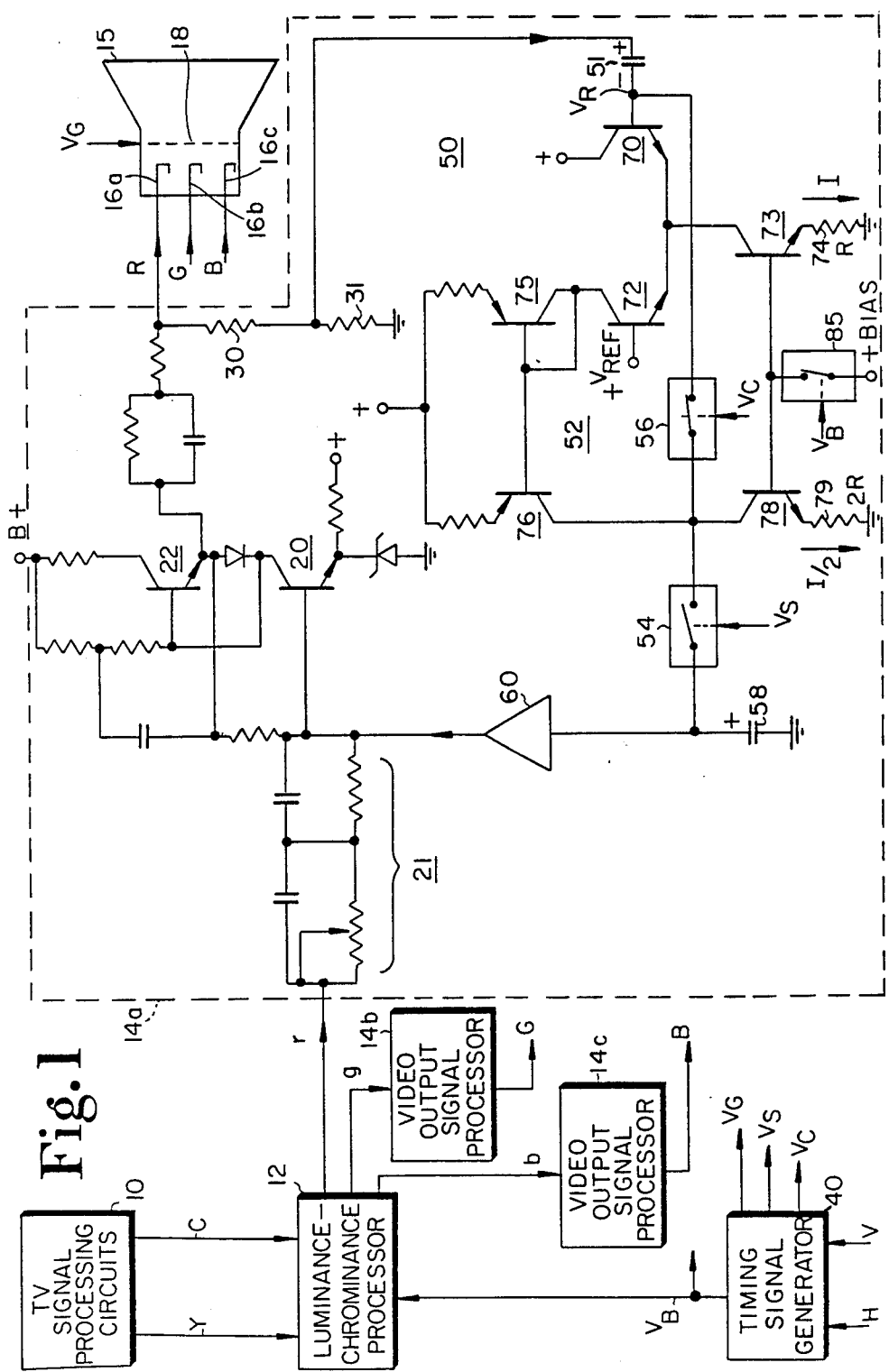

United States Patent [19]

Parker

[11] Patent Number: 4,484,229

[45] Date of Patent: Nov. 20, 1984

[54] AUTOMATIC KINESCOPE BIAS CONTROL SYSTEM WITH SELECTIVELY DISABLED SIGNAL PROCESSOR

[75] Inventor: Robert P. Parker, Indianapolis, Ind.

[73] Assignee: RCA Corporation, New York, N.Y.

[21] Appl. No.: 437,831

[22] Filed: Oct. 29, 1982

[51] Int. Cl.$^3$ .................. H04N 5/68; H04N 9/535
[52] U.S. Cl. ........................ 358/243; 358/27;
358/29; 358/74
[58] Field of Search ............ 358/29, 33, 34, 74,
358/171, 242, 243; 307/352, 353; 328/150, 151,
168, 169, 171, 172, 175

[56] References Cited

U.S. PATENT DOCUMENTS

| | | | |
|---|---|---|---|
| 4,331,981 | 5/1982 | Parker | 358/243 |
| 4,387,405 | 6/1983 | Hinn | 358/243 |
| 4,414,577 | 11/1983 | Tallant | 358/242 |

*Primary Examiner*—Tommy P. Chin
*Attorney, Agent, or Firm*—Eugene M. Whitacre; Paul J. Rasmussen; Ronald H. Kurdyla

[57] ABSTRACT

A system for automatically controlling the bias of a kinescope in a television receiver comprises an input sampling amplifier, and an input clamping network including a clamp capacitor. A reference voltage developed on the clamp capacitor is applied to the input of the sampling amplifier for establishing its initial reference bias condition. The amplifier conducts during sampling intervals for sampling signal amplitude changes referenced to the reference voltage provided via the clamp capacitor. The amplifier is rendered nonconductive at other times, to thereby effectively decouple the discharge path for the clamp capacitor, whereby the clamp capacitor is prevented from discharging significantly during intervals when the AKB signal processor is not engaged in signal clamping and sampling functions.

4 Claims, 2 Drawing Figures

AUTOMATIC KINESCOPE BIAS CONTROL SYSTEM WITH SELECTIVELY DISABLED SIGNAL PROCESSOR

This invention concerns a signal clamping and sampling network in a system for automatically controlling the bias of a kinescope in a television receiver.

Color television receivers sometimes employ an automatic kinescope bias (AKB) control system for automatically establishing proper black image representative current levels for each electron gun of a color kinescope of the receiver. As a result of this operation, pictures reproduced by the kinescope are prevented from being adversely affected by variations of kinescope operating parameters (e.g., due to aging and temperature effects).

An AKB system typically operates during image blanking intervals, at which time each electron gun of the kinescope conducts a small black image representative blanking current in response to a reference voltage representative of black video signal information. This current is processed by the AKB system to generate a signal which is representative of the currents conducted during the blanking interval, and which is used to maintain a desired black current level.

In one type of AKB system, control circuits respond to a periodically derived pulse signal with a magnitude representative of the cathode black current level. The derived signal is processed by control circuits including clamping and sampling networks for developing a kinescope bias correction signal which increases or decreases in magnitude, and which is coupled to the kinescope for maintaining a correct black current level. The clamping network includes a clamping capacitor for establishing a reference condition for the signal information to be sampled in accordance with the level of a reference voltage developed on the clamp capacitor. The reference voltage is applied to the sampling network for establishing an initial reference bias condition for the sampling network. An AKB system of this type is described in my U.S. Pat. No. 4,331,981, for example.

In an AKB system wherein amplitude variations to be sampled are very small, the clamping reference voltage with respect to which small signal amplitude variations are sampled should be established reliably and accurately. Accordingly, it is herein recognized as desirable to assure that the clamping capacitor is not permitted to discharge significantly, particularly during the relatively long interval when the AKB signal processing circuits are not engaged in the signal clamping and sampling functions.

In accordance with the principles of the present invention, the AKB signal processing network comprises an input sampling amplifier, and an input clamping network including a clamp capacitor. A reference voltage exhibited by the clamp capacitor is applied to the input of the sampling amplifier for establishing an initial reference bias condition for the sampling amplifier. The sampling amplifier is rendered conductive during sampling intervals for sampling signal amplitude variations referenced to the reference voltage provided by the clamp capacitor. The sampling amplifier is rendered non-conductive at other times, to thereby effectively decouple the discharge path for the clamp capacitor, whereby the clamp capacitor is prevented from discharging significantly during intervals when the AKB signal processor is not engaged in signal clamping and sampling functions.

Figure 2:
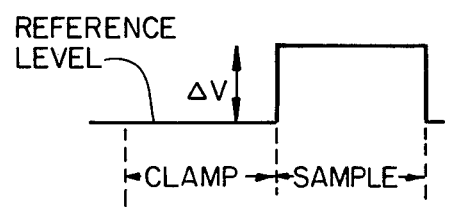

In the drawing:

FIG. 1 shows a portion of a color television receiver including an AKB system comprising a signal clamping and sampling network according to the present invention; and FIG. 2 illustrates a waveform which is helpful in understanding the operation of the AKB system.

In FIG. 1, television signal processing circuits 10 provide separated luminance (Y) and chrominance (C) components of a composite color television signal to a luminance-chrominance signal processing network 12. Processor 12 includes luminance and chrominance gain control circuits, DC level setting circuits (e.g., comprising keyed black level clamping circuits), color demodulators for developing r-y, g-y and b-y color difference signals, and matrix amplifiers for combining the latter signals with processed luminance signals to provide low level color image representative signals r, g and b. These signals are amplified and otherwise processed by circuits within video output signal processing networks 14a, 14b and 14c, respectively, which supply high level amplified color image signals R, G and B to respective cathode intensity control electrodes 16a, 16b and 16c of a color kinescope 15. Networks 14a, 14b and 14c also perform functions related to the automatic kinescope bias (AKB) control function, as will be discussed. Kinescope 15 is of the self-converging in-line gun type with a commonly energized control grid 18 associated with each of the electron guns comprising cathode electrodes 16a, 16b and 16c.

Since output signal processors 14a, 14b and 14c are similar in this embodiment, the following discussion of the operation of processor 14a also applies to processors 14b and 14c.

Processor 14a includes a kinescope driver stage comprising a lower rank input transistor 20 configured as a common emitter amplifier which receives video signal r from processor 12 via an input signal coupling network 21, and an upper rank high voltage output transistor 22 configured as a common base amplifier which together with transistor 20 forms a cascode video driver amplifier. High level video signal R, suitable for driving kinescope cathode 16a, is developed at the emitter of transistor 22 and is applied to kinescope cathode 16a.

A timing signal generator 40 containing combinational and sequential logic control circuits as well as level shifting circuits responds to periodic horizontal synchronizing rate signals (H) and to periodic vertical synchronizing rate signals (V), both derived from deflection circuits of the receiver, for generating timing signals $V_B$, $V_S$, $V_C$, and $V_G$ which control the operation of the AKB function during periodic AKB intervals. Each AKB interval begins shortly after the end of the vertical retrace interval within the vertical blanking interval, and encompasses several horizontal line intervals also within the vertical blanking interval and during which video signal image information is absent. Timing signal generator 40 can be constructed using techniques disclosed in U.S Pat. No. 4,277,798—Hinn, titled "Automatic Kinescope Biasing System with Increased Interference Immunity". Timing signal $V_B$ is used to inhibit video signals during AKB operating intervals, and comprises a pulse generated soon after the vertical retrace interval ends. Signal $V_B$ exists for the duration of the AKB interval and is applied to a blanking control input terminal of luminance-chrominance processor 12 for causing the r, g and b outputs of processor 12 to exhibit a black image representative DC reference level corresponding to the absence of video signals. This can be accomplished by reducing the signal gain of processor 12 to substantially zero via the gain control circuits of processor 12 in response to signal $V_B$, and by modifying the DC level of the video signal processing path via the DC level control circuits of processor 12 to produce a black image representative reference level at the signal outputs of processor 12. Timing signal $V_G$, used as a positive grid drive pulse, encompasses a few (e.g., three) horizontal line intervals within the vertical blanking interval. Timing signal $V_C$ is used to control the operation of a clamping circuit associated with the signal sampling function of the AKB system. Timing signal $V_S$, used as a sampling control signal, occurs after signal $V_C$ and serves to time the operation of a sample and hold circuit which develops a DC bias control signal for controlling the kinescope cathode black current level. Signal $V_S$ encompasses a sampling interval (e.g., three horizontal line intervals) the beginning of which is slightly delayed relative to the end of the clamping interval encompassed by clamping control signal $V_C$, and the end of which substantially coincides with the end of the AKB interval.

Referring again to FIG. 1, during the AKB interval positive pulse $V_G$ (e.g., on the order of +10 volts) forward biases grid 18 of the kinescope for causing the electron gun comprising cathode 16a and grid 18 to increase conduction. At times other than the AKB intervals, signal $V_G$ provides the normal, less positive, bias for grid 18. In response to positive grid pulse $V_G$, a similarly phased, positive current pulse appears at cathode 16a during the grid pulse interval. The amplitude of the cathode output current pulse so developed is proportional to the level of cathode black current conduction (typically a few microamperes).

The induced cathode output pulse causes a corresponding voltage pulse to be developed across voltage divider resistors 30 and 31 such that a voltage pulse proportional to the induced cathode output pulse appears across resistor 31. This voltage pulse is applied to an AKB bias control signal processor 50.

Network 50 performs signal clamping and sampling functions. The clamping function is performed during a clamping interval (coincident with timing signal $V_C$) within each AKB interval, by means of a feedback clamping network comprising an input AC coupling capacitor 51, an operational transconductance amplifier 52, and an electronic switch 56. The sampling function is performed during a sampling interval (coincident with timing signal $V_S$), following the clamping interval during each AKB interval, by means of a network comprising amplifier 52, an electronic switch 54, and an average responding charge storage capacitor 58.

A kinescope bias correction voltage is developed across capacitor 58 and is applied to a bias control input of kinescope driver 20, 22 at the base of transistor 20, via a coupling network 60 (e.g., comprising a buffer stage and level shifting circuits) which provides an output bias control voltage compatible with the input requirements of transistor 20. The correction voltage developed across capacitor 58 serves to automatically maintain a desired correct level of kinescope black current conduction by feedback control action.

Transconductance amplifier 52 comprises differentially connected input transistors 70 and 72. A fixed reference voltage $V_{REF}$ is applied to the base of transistor 72, and signals to be sampled are coupled to the base input of transistor 70 via AC coupling capacitor 51. The collector output circuit of transistor 72 comprises an active load "current mirror" (or current repeating network) comprising PNP transistors 75, 76. A transistor 73 and an associated current determining resistor 74 act as a current source for transistors 70, 72. A transistor 78 and an associated current determining resistor 79 act as a current source for transistor 76. The value of resistor 79 (2R) is chosen relative to the value of resistor 74 (R) so that the current sourced by transistor 78, I/2, is equal to one-half the current I sourced by transistor 73. During sampling intervals, transconductance amplifier 52 develops output current variations at the interconnected collectors of transistors 76, 78 in response to input voltage variations at the base of transistor 70.

It is noted that the conduction of amplifier 52 is controlled in response to a bias potential (+BIAS) selectively applied to current source transistors 73 and 78 via an electronic switch 85, which responds to timing signal $V_B$. Switch 85 conducts in response to signal $V_B$ during the AKB operating intervals, thereby applying bias potential to transistors 73 and 78 whereby amplifier 52 is enabled to operate. At other times, however, switch 85 is non-conductive and operating bias is removed from transistors 73 and 78, whereby amplifier transistors 70 and 72 are rendered non-conductive. With transistor 70 being non-conductive, a reference voltage $V_R$ developed at the negative (−) terminal of clamp capacitor 51 is advantageously prevented from discharging significantly via input currents of transistor 70 during the relatively long intervals when the AKB clamping and sampling functions are not being performed. This aspect of the disclosed arrangement will be discussed in greater detail in connection with the following description of the AKB clamping and sampling process, made with reference to the waveform of FIG. 2.

The waveform of FIG. 2 depicts the input voltage appearing at the base signal input of amplifier transistor 70 during the clamping and sampling intervals. During the initial clamping interval, a reference level corresponding to reference voltage $V_R$ at the negative terminal of capacitor 51 is developed at the base of transistor 70. Signal amplitude variations are sampled with respect to this reference level during the subsequent sampling interval. The signal to be sampled appears during the subsequent sampling interval, and manifests an amplitude $\Delta V$ which varies in accordance with variations in the level of the kinescope black current. The amplitude variations being sampled are very small, on the order of a few millivolts with respect to an amplitude corresponding to a correct kinescope black current level.

Continuing with FIG. 1, clamping switch 56 conducts only during the clamping interval in response to timing signal $V_C$, and sampling switch 54 conducts only during the sampling interval in response to timing signal $V_S$. Bias switch 75 conducts only during the clamping and sampling intervals.

During the clamping reference interval, the collector output of transistor 72 is coupled to the negative terminal of capacitor 51 at the base input of transistor 70 via the current mirror amplifier comprising diode connected transistor 75 and transistor 76 and switch 56 to form a negative current feedback path. Output storage capacitor 58 is decoupled from amplifier 52 at this time. The negative terminal of capacitor 51 charges via currents conducted by transistors 72, 75 and 76 until the base voltages of transistor 70 and 72 are substantially equal (i.e., the differential input voltage of amplifier 52 is substantially zero). At this time current I sourced by transistor 73 divides equally between the collector currents of transistor 70 and 72, whereby the collector currents of transistors 72 and 76 equal the collector current (I/2) conducted by transistor 78. Therefore all of the collector current conducted by transistor 76 flows as collector current in transistor 78. The current feedback path settles to a zero current condition prior to the end of the clamping interval, at which time transistor 78 "sinks" all of the collector current conducted by transistor 76, and zero feedback current flows to the base of transistor 70 and capacitor 51.

Thus by current feedback action the base input of transistor 70 is clamped to a DC reference level $V_R$ during the clamping interval. Reference voltage $V_R$ is a function of $V_{REF}$ and, in this instance, is equal to $V_{REF}$. At the end of the clamping interval the voltage across capacitor 51 is equal to the difference between voltage $V_R$ at the negative terminal of capacitor 51, and a nominal DC voltage at the positive terminal of capacitor 51. The latter voltage is a function of the kinescope cathode voltage developed in response to the black image condition during the AKB interval.

During the subsequent sampling interval when capacitor 58 is coupled to the output of amplifier 52 via switch 54, the charge on capacitor 58 remains unchanged unless the input signal applied to transistor 70 is sufficient to alter the balanced base bias of transistor 70 as established during the preceding clamping reference interval. For example, an increase in the base voltage of transistor 70 induced by an increase in the amplitude of the input pulse to be sampled causes a corresponding decrease in the collector current of transistors 72 and 75 and also in the collector current of transistor 76 due to current repeater action. Capacitor 58 then discharges via transistor 78 by an amount corresponding to the decreased current conduction of transistor 76, to thereby reduce the voltage on capacitor 58. In this instance transistor 78 acts as a current sink with respect to discharging of capacitor 58. Similarly, a decrease in the base voltage of input transistor 70 causes a corresponding increase in the collector current of output transistor 76. Capacitor 58 charges via transistor 76 in response to this increased current conduction, whereby the voltage on capacitor 58 increases. In this case transistor 76 acts as a current source with respect to charging of capacitor 58.

As noted previously, amplifier input transistor 70 is advantageously rendered non-conductive when amplifier 52 is rendered non-conductive during intervals when the clamping and sampling functions are not being performed. When amplifier 52 and transistor 70 are non-conductive, the negative terminal of capacitor 51 is conductively decoupled such that the negative terminal of capacitor 51 is essentially deprived of a discharge path (at this time switch 56 is non-conductive since switch 56 conducts only during AKB clamping intervals). This feature of the disclosed AKB signal processing arrangement is important because if amplifier 52 remained conductive from one AKB interval to the next, the negative terminal of capacitor 51 could discharge by a significant amount via the base current of transistor 70. In this system discharging the negative terminal of capacitor 51 (i.e., decreasing reference voltage $V_R$) by as little as thirty millivolts could compromise the effectiveness of the signal clamping function. In this regard it is noted that the reference voltage $V_R$ established on capacitor 51 must be accurate to within a fraction of a millivolt since the voltage change at the input of amplifier transistor 70 varies by only a few millivolts during AKB intervals when kinescope bias is incorrect, and such voltage change must be developed accurately and reliably at the input of amplifier 52. The value of input capacitor 51 is somewhat large (approximately 0.12 microfarads), the clamping interval is very short (three horizontal line intervals), and the time constant determined by the values of capacitor 51 and resistor 31 limits the rate at which the negative terminal of capacitor 51 can be charged with respect to developing reference voltage $V_R$.

When amplifier 52 is non-conductive, the discharge current for capacitor 51 comprises the negligibly small collector-to-base leakage current of transistor 70. This leakage current is several orders of magnitude less than the base current of transistor 70 when conducting.

Alternatively, the negative terminal of capacitor 51 at which reference voltage $V_R$ is developed could be decoupled during non-AKB intervals by means of an electronic switch situated between capacitor 51 and the base input of amplifier transistor 70. This approach is less desirable than the described technique because of increased circuit complexity.

What is claimed is:

1. In a system for automatically controlling the level of black image current conducted by an image display device, said system being operative during control intervals within image blanking intervals and comprising:
    means for deriving a signal representative of the magnitude of said black image current;
    signal sampling means responsive to said derived representative signal for providing an output bias control signal to said image display device for maintaining a desired black current level;
    means, including a charge storage device coupled to said deriving means and said signal sampling means, operative during said control intervals for developing a reference voltage on said charge storage device for establishing a reference bias condition for said signal sampling means; and
    means for substantially inhibiting currents conducted by said sampling means during intervals other than said control intervals, to prevent the charge on said storage device and thereby said reference voltage from being modified significantly during said other intervals.

2. Apparatus according to claim 1, wherein
    said sampling means comprises an input amplifier;
    said reference voltage provided by said charge storage device is coupled to a signal input of said amplifier for establishing said reference bias condition;
    said amplifier is rendered non-conductive during said other intervals to prevent significant discharge of said storage device via input currents during said other intervals; and
    said other intervals are several orders of magnitude longer than said control intervals.

3. Apparatus according to claim 2, wherein
    said charge storage device comprises an input AC coupling capacitor with a first terminal coupled to said signal deriving means and a second terminal coupled to said signal input of said amplifier; and
    said reference voltage is developed at said second terminal of said capacitor.

4. Apparatus according to claim 3, and further comprising
a source of operating current for said amplifier; wherein
said current source is rendered non-conductive during said other intervals for thereby rendering said amplifier non-conductive.

* * * * *